(12) United States Patent
Pritchard et al.

(10) Patent No.: US 7,896,146 B2
(45) Date of Patent: Mar. 1, 2011

(54) CLUTCH DEVICE UTILIZING BRUSHLESS MOTOR

(75) Inventors: Larry A. Pritchard, Macomb, MI (US); Christopher J. Kowalsky, Windsor (CA)

(73) Assignee: BorgWarner, Inc., Auburn Hills, MI (US)

( * ) Notice: Subject to any disclaimer, the term of this patent is extended or adjusted under 35 U.S.C. 154(b) by 539 days.

(21) Appl. No.: 12/004,695

(22) Filed: Dec. 20, 2007

(65) Prior Publication Data

US 2008/0149451 A1     Jun. 26, 2008

Related U.S. Application Data

(60) Provisional application No. 60/876,082, filed on Dec. 20, 2006.

(51) Int. Cl.
F16D 28/00     (2006.01)

(52) U.S. Cl. .................. 192/84.6; 192/70.23; 192/84.7; 192/93 A

(58) Field of Classification Search .................. 192/84.7
See application file for complete search history.

(56) References Cited

U.S. PATENT DOCUMENTS

| | | | |
|---|---|---|---|
| 4,628,752 A | 12/1986 | Paxton et al. | |
| 4,895,236 A | 1/1990 | Sakakibara et al. | |
| 4,976,347 A * | 12/1990 | Sakakibara et al. | ........... 192/20 |
| 5,330,030 A | 7/1994 | Eastman et al. | |
| 5,363,938 A | 11/1994 | Wilson et al. | |
| 5,423,235 A | 6/1995 | Botterill et al. | |
| 5,462,496 A | 10/1995 | Dick et al. | |
| 5,943,911 A | 8/1999 | Beckerman | |
| 6,101,897 A | 8/2000 | Showalter | |
| 6,102,178 A * | 8/2000 | Walton | ........................ 192/35 |
| 6,631,779 B2 | 10/2003 | Watson et al. | |
| 6,691,845 B2 | 2/2004 | Showalter | |
| 6,779,641 B2 | 8/2004 | Vonnegut et al. | |
| 6,780,134 B2 | 8/2004 | Vonnegut et al. | |
| 6,808,052 B2 | 10/2004 | Kirkwood et al. | |
| 6,808,053 B2 | 10/2004 | Kirkwood et al. | |
| 6,814,681 B2 | 11/2004 | Porter | |
| 6,848,550 B2 | 2/2005 | Puiu et al. | |
| 6,848,555 B2 | 2/2005 | Sakata et al. | |
| 6,878,088 B2 | 4/2005 | Williams | |
| 6,888,273 B2 | 5/2005 | Hughes et al. | |
| 6,929,577 B2 | 8/2005 | Mueller et al. | |
| 6,945,375 B2 | 9/2005 | Kirkwood et al. | |
| 6,951,521 B2 | 10/2005 | Hakui | |
| 6,966,864 B2 | 11/2005 | Williams et al. | |
| 7,004,875 B2 | 2/2006 | Williams et al. | |

(Continued)

Primary Examiner—Richard M. Lorence
(74) Attorney, Agent, or Firm—Warn Partners, P.C.

(57) ABSTRACT

A clutch assembly which incorporates brushless motor technology to engage a clutch pack to cause two shafts to rotate in unison. The clutch actuation assembly includes a clutch apply member, a base plate disposed about an axis, a cam plate disposed about the axis, and at least one cam, operably associated with the base plate and the cam plate. At least one load transferring member operably associated with the at least one cam, as well as an actuator for providing relative rotation between the cam plate and the base plate about the axis, causing the at least one load transferring member to move with respect to the at least one cam, and the cam plate to translate along the axis actuating said clutch apply member.

16 Claims, 5 Drawing Sheets

U.S. PATENT DOCUMENTS

| | | |
|---|---|---|
| 7,014,587 B2 | 3/2006 | Grundl et al. |
| 7,033,300 B2 | 4/2006 | Mueller et al. |
| 7,042,128 B2 | 5/2006 | Zepp et al. |
| 7,111,716 B2 | 9/2006 | Ekonen et al. |
| 2004/0050643 A1 | 3/2004 | Krzesicki et al. |
| 2004/0163916 A1* | 8/2004 | Showalter ............. 192/48.2 |
| 2004/0163918 A1 | 8/2004 | Kirkwood et al. |
| 2005/0040000 A1 | 2/2005 | Kelley, Jr. et al. |
| 2005/0070395 A1 | 3/2005 | DeGowske |
| 2005/0167231 A1 | 8/2005 | Kurmaniak |
| 2005/0176543 A1 | 8/2005 | Kirkwood et al. |
| 2006/0079369 A1 | 4/2006 | Mohan et al. |
| 2006/0094556 A1 | 5/2006 | Mizon et al. |
| 2009/0032352 A1* | 2/2009 | Pritchard et al. ........... 192/3.52 |

* cited by examiner

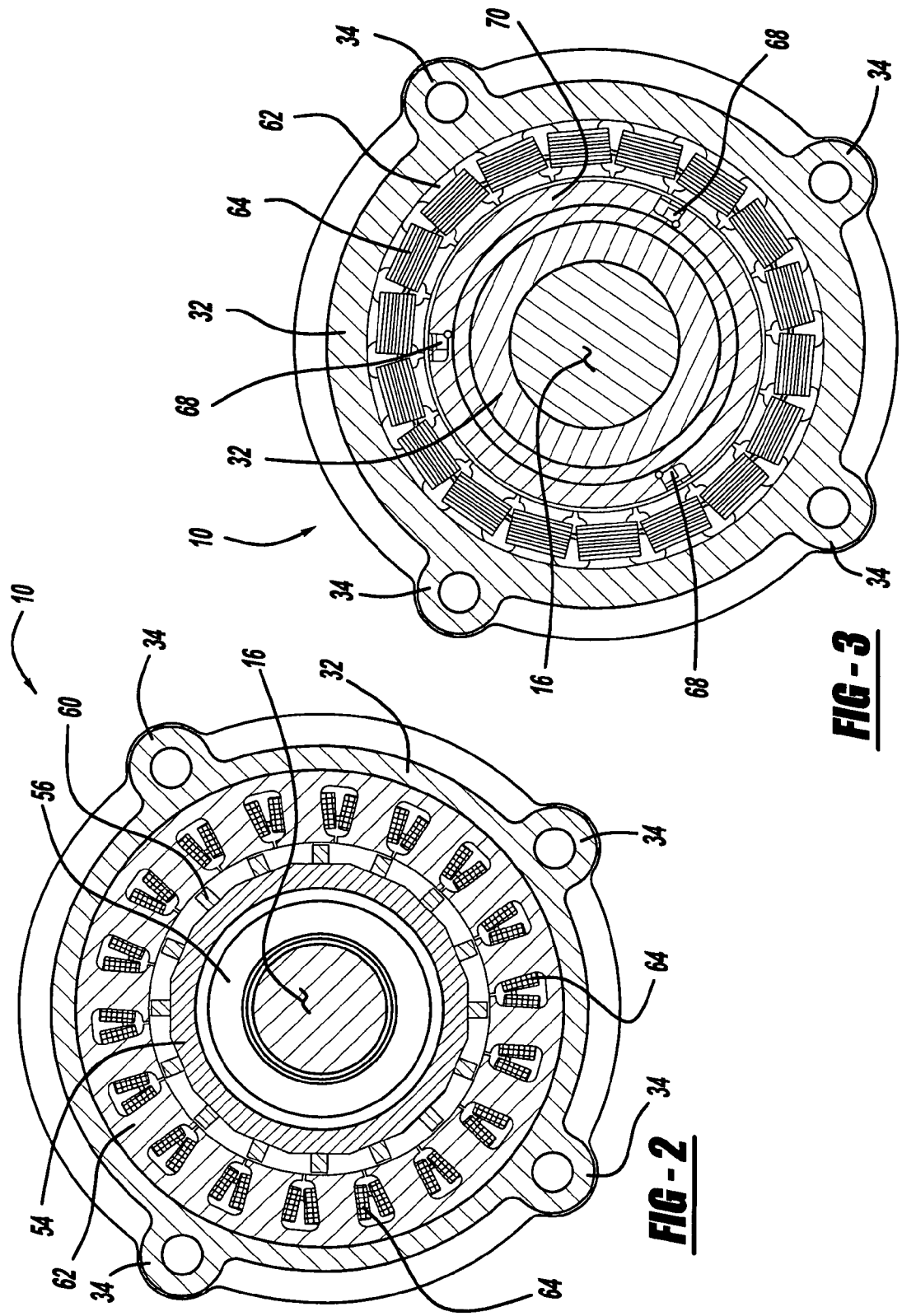

CLUTCH DEVICE UTILIZING BRUSHLESS MOTOR

CROSS-REFERENCE TO RELATED APPLICATIONS

This application claims the benefit of U.S. Provisional Application No. 60/876,082, filed Dec. 20, 2006.

FIELD OF THE INVENTION

The present invention relates to clutch assemblies, more particularly, incorporating brushless motor technology into actuating a clutch assembly.

BACKGROUND OF THE INVENTION

Clutch assemblies are commonly used in transmissions and transfer cases for transferring rotational power between two shafts. Typically, this rotational power is transferred through the use of a clutch pack. The clutch pack has a first set of clutch plates which is splined to one shaft and a second set of clutch plates which is splined to another shaft. When the clutch pack is fully compressed, the clutch plates will rotate together thereby causing the two shafts to rotate together.

The clutch pack can also be compressed so as to allow for slip to occur between the first set of clutch plates and the second set of clutch plates, varying the amount of rotational power transferred through the clutch pack, and the two shafts, thereby providing improved vehicle dynamic control. Also, the slip between the first set of clutch plates and the second set of clutch plates can be set to a specific torque level to transfer a specific amount of torque between the two shafts. These clutch packs can be actuated in a number of ways.

One way is to use what is commonly known as a "ball ramp assembly," which usually consists of a base plate having a series of recesses which support a set of load transferring balls, and a cam plate which also has a series of recesses for supporting the load transferring balls. When the base plate and cam plate are rotated relative to one another they will separate and the distance between them will increase, which will apply force to the clutch pack. One way to actuate the ball ramp assembly is through the use of an electromagnetic clutch. If an electromagnetic clutch is used, the base plate and the cam plate will rotate about the axis in which the shafts rotate. Once the electromagnetic clutch causes relative rotation between the cam plate and the base plate, the load transferring balls will roll in the recesses in the cam plate and the base plate, causing the cam plate to translate axially along the axis about which the shafts rotate, thereby applying force to the clutch pack.

The electromagnetic clutch is usually mounted to the housing and is actuated when electric current is applied to an electromagnetic coil. While using an electromagnetic coil to actuate the ball ramp assembly has proven to be effective, using the electromagnetic coil does not always coincide with various packaging requirements. Also, some applications require a "preemptive" feature for increasing the speed of the engagement of the clutch pack. A preemptive feature includes the use of a solenoid, or other electronic device, for preemptively engaging the clutch pack prior to engagement by the ball ramp assembly. Incorporating a preemptive feature improves overall response time.

However, clutch packs having an electromagnetic clutch do not allow for the incorporation of a preemptive feature because the operation of an electromagnetic clutch requires relative rotation between the base plate and the cam plate for engagement, whereas a clutch pack having a preemptive feature requires that either the base plate or cam plate remain stationary.

Accordingly, there exists a need for an improved way to actuate a ball ramp assembly to engage a clutch pack.

SUMMARY OF THE INVENTION

The present invention is a clutch assembly which incorporates brushless motor technology to engage a clutch pack and cause two shafts to rotate in unison, or to provide controlled slip in the clutch pack to control the difference in speed between two shafts. The present invention is a clutch actuation assembly having a clutch apply member, a base plate disposed about an axis, a cam plate disposed about the axis, and at least one cam, operably associated with the base plate and the cam plate. The present invention also includes at least one load transferring member operably associated with the at least one cam, as well as an actuator for providing relative rotation between the cam plate and the base plate about the axis, causing the at least one load transferring member to move with respect to the at least one cam, and the cam plate to translate along the axis actuating the clutch apply member. The clutch pack is used to synchronize the rotation of two shafts, or to control the differential speed between the two shafts.

One embodiment of the actuator includes a rotor connected to and circumscribed by a magnetic rotor, with the rotor connected to the base plate. The actuator also includes a stator having at least one coil winding, with the stator surrounding the rotor. When electrical power is applied to the coil winding, the rotor will rotate causing the ball to rotate within the cam, thereby causing the cam plate to translate along the axis. The actuator also uses a sensor for sensing the rotational position of the rotor, providing precise control of the engagement of the clutch pack.

Another embodiment of the actuator includes a long-travel solenoid having a coil winding disposed within a solenoid housing, a plunger partially extending into the solenoid housing, operably associated with a coil winding and disposed along a plunger axis with the plunger axis being perpendicular to the axis, and a ball crank mechanism connected to the plunger and the base plate. When electrical power is applied to the coil winding, the plunger will translate along the plunger axis, causing the ball crank mechanism to rotate the base plate about the axis, and the ball to rotate in the cam.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a sectional front view taken along line 2-2 of FIG. 1, of a clutch assembly incorporating brushless motor technology, according to the present invention;

FIG. 3 is a sectional front view taken along line 3-3 in FIG. 1, of a clutch assembly incorporating brushless motor technology, according to the present invention;

DETAILED DESCRIPTION OF THE PREFERRED EMBODIMENTS

The following description of the preferred embodiment(s) is merely exemplary in nature and is in no way intended to limit the invention, its application, or uses.

Figure 1:
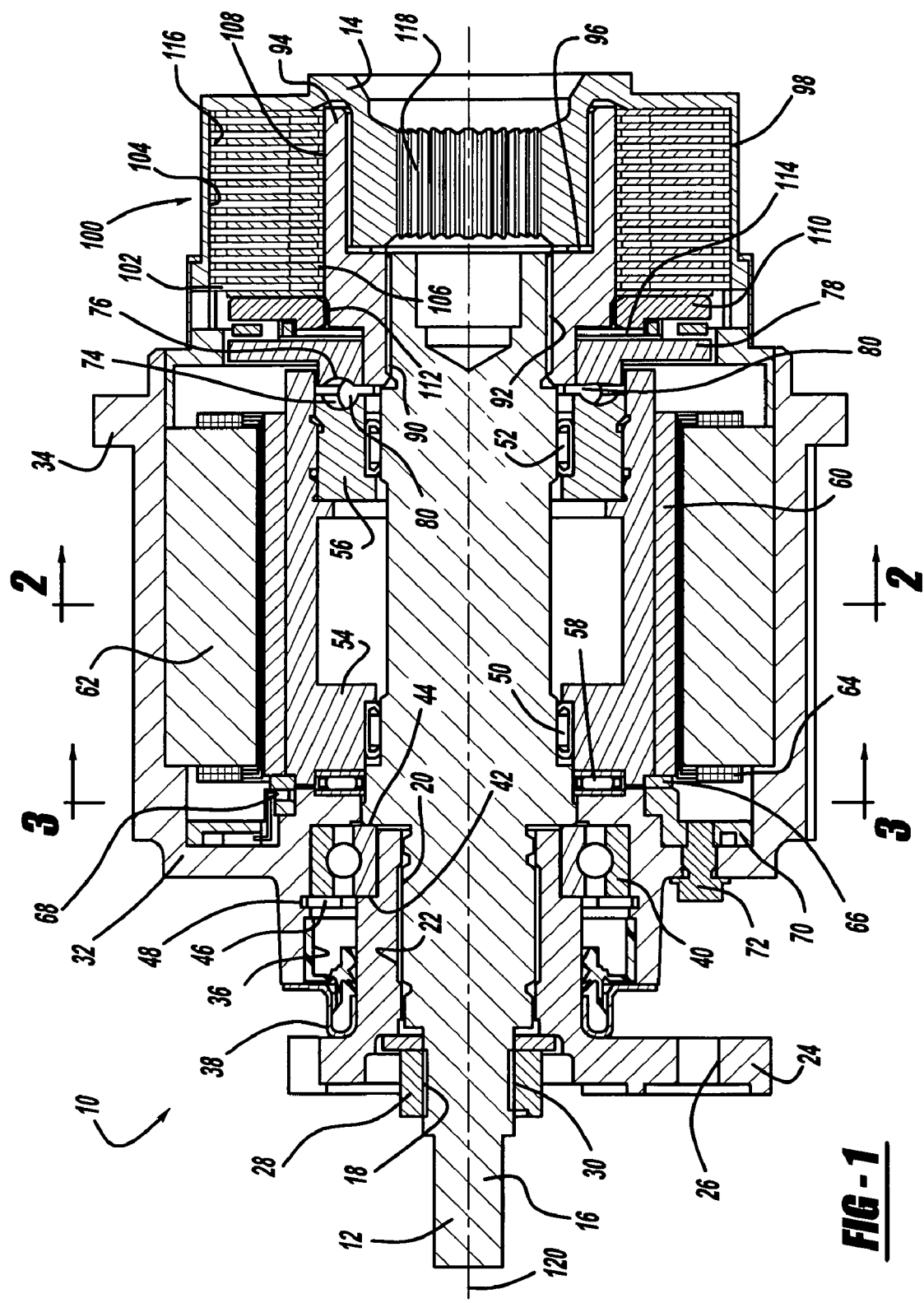
FIG. 1 is a sectional side view of a clutch assembly incorporating brushless motor technology, according to the present invention.

A clutch assembly incorporating brushless motor technology according to the present invention is generally shown in FIG. 1 at 10. The clutch assembly 10 includes an input member 12 selectably connected to an output member 14. The input member 12 has a shaft 16 which includes a series of threads 18 and splines 20. The splines 20 engage a series of corresponding splines 22 on a flange 24. The flange 24 has a series of apertures 26 which can be used to connect the flange 24 and thereby the clutch assembly 10 to a shaft providing input power. The flange 24 is secured to the input member 12 through the use of a retaining nut 28 which also includes a series of corresponding threads 30 which are received by the threads 18 on the input member 12.

The clutch assembly 10 also includes a housing 32 which has multiple protrusions 34 which are used to attach the clutch assembly 10 to a transmission, differential, or transfer case, depending upon the particular application in which the clutch assembly 10 is to be used. Located in between the housing 32 and the flange 24 is a seal 36 and a deflector 38 which are used to prevent fluid leakage from the clutch assembly 10, and prevent debris from entering the clutch assembly 10.

The flange 24 is supported in the housing 32 by a ball bearing 40. The ball bearing 40 is disposed between a shoulder 42 on the flange 24, and a corresponding shoulder 44 on the shaft 16. Once the retaining nut 28 is tightened completely, the amount of space between the shoulder 42 and the corresponding shoulder 44 will be the proper amount of space for the ball bearing 40 to fit into, and hold the shaft 16 in place, while prohibiting the shaft 16 from sliding within the housing 32. The ball bearing 40 is held in the housing 32 by a clip 46 in a groove 48.

The shaft 16 is also supported by a pair of needle bearings 50,52. The needle bearings 50,52 are surrounded by a rotor 54 having a base plate 56. The rotor 54 is allowed to rotate relative to the shaft 16 by way of the needle bearings 50,52, and relative to the housing because of a thrust bearing 58. The rotor 54 is surrounded by, and connected to a magnet rotor 60. The magnet rotor 60 is surrounded by a stator 62 having a series of coil windings 64, best shown in FIGS. 2 and 3. The magnet rotor 60 includes a magnet 66 which is used along with a sensor 68 to detect the position of the magnet rotor 60 relative to the housing 32. The sensor 68 is part of a sensor plate 70 which is attached to the housing 32 through the use of a set of fasteners 72.

The rotor 54, the magnet rotor 60, stator 62, and coil windings 64 are all typical components used in a conventional brushless motor, and form an actuator used to rotate the base plate 56.

Figure 4B:
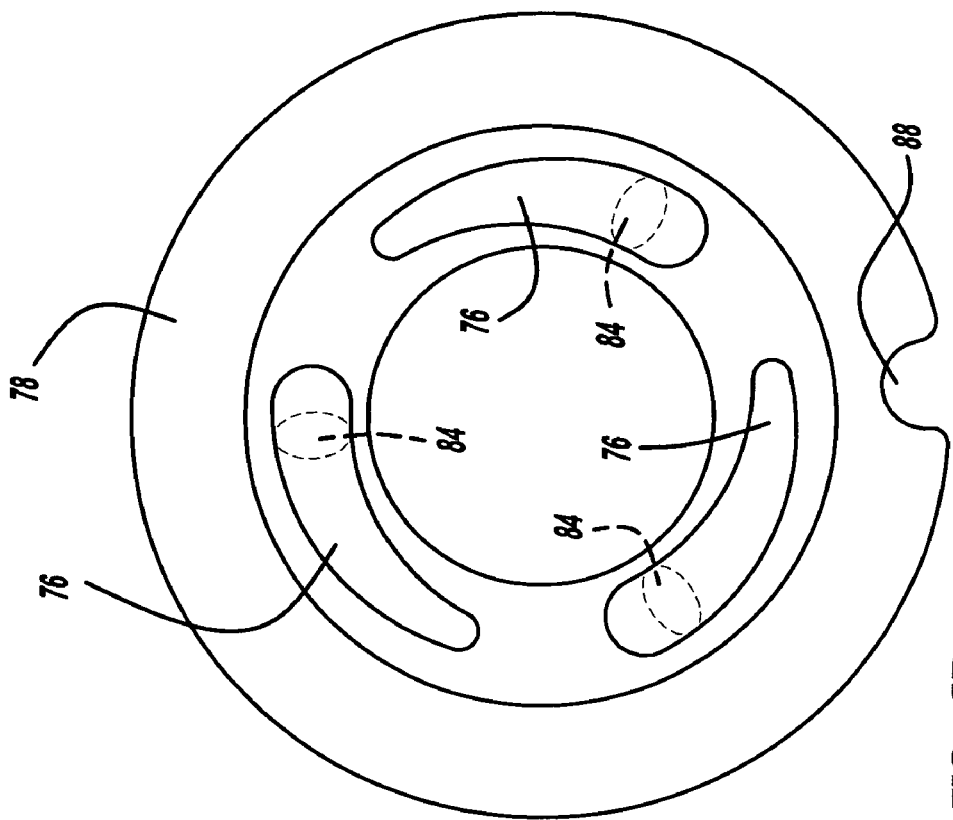
FIG. 4b is a front view taken along line 4b in FIG. 1 of a cam plate used in a clutch assembly having brushless motor technology, according to the present invention.
Figure 4A:
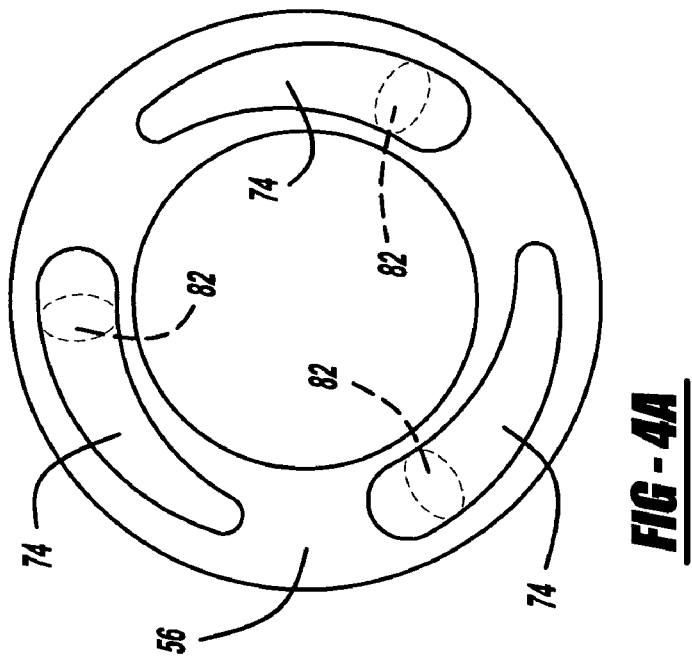
FIG. 4a is a rear view taken along line 4a in FIG. 1 of a base plate used in a clutch assembly incorporating brushless motor technology, according to the present invention.

The base plate 56 has at least one cam, but more preferably a first series of cams 74 which are used with at least one cam, but more preferably a second series of cams 76 located in a cam plate 78 for supporting at least one load transferring member, which in this embodiment is a set of load transferring balls 80. In an alternate embodiment, the first series of cams 74 include a first set of detents 82 (shown in phantom) which are used along with a series of corresponding second set of detents 84 (also shown in phantom) in the second series of cams 76 to hold the load transferring balls 80 in a stationary position when the magnet rotor 60 is not actuated. The cam plate 78 is restricted from rotating relative to the housing 32 by the use of a projection (not shown). The projection extends into an anti-rotation feature 88 (shown in FIGS. 4B and 5) which restricts the cam plate 78 from rotating about the axis 120, but allows the cam plate 78 to translate along the axis 120.

The shaft 16 also has a second set of splines 90 which are complementary to a set of splines 92 on an extension 94. The output member 14 is partially disposed within the extension 94, partially surrounds the extension 94, and is allowed to rotate relative to the extension 94 and the shaft 16 by way of a thrust bearing 96. The output member 14 has a clutch housing 98 which is used for receiving a clutch apply member such as a clutch pack 100. The clutch pack 100 is a typical clutch pack having a first series of clutch plates 102 connected to the clutch housing 98 through a spline connection 104, interleaved with a second series of clutch plates 106 connected to the extension 94 through a spline connection 108.

The extension 94 also supports an apply plate 110 which is able to slide along the outside of the extension 94 through the use of a spline connection 112. The apply plate 110 is allowed to rotate relative to the cam plate 78 while still having the ability to receive force from the cam plate 78 because of a thrust bearing 114. The clutch pack 100 is compressed by the apply plate 110, the function of which will be described later. The output member 14 also includes two sets of splines. The first set of splines 116 are disposed within the clutch housing 98 and are used for supporting the first series of clutch plates 102, and the second set of splines 118 are used for connecting the output member 14 to a shaft (not shown) for transferring power.

The input member 12, output member 14, rotor 54, base plate 56, and apply plate 110 all rotate about a single axis 120.

In operation, the flange 24 receives power from an object such as a shaft, which drives the input member 12. The input member 12 causes the apply plate 110 and the extension 94 to rotate as well, while the rotor 54, base plate 56, and the magnet rotor 60 are allowed to remain stationary because of the needle bearings 50, 52. The load transferring balls 80 therefore remain stationary, along with the cam plate 78. If the first and second detents 82,84 are incorporated into the assembly 10, the first and second detents 82,84 will aid in holding the cam plate 78 and load transferring balls 80 in a stationary position.

When power is applied to the coil windings 64, the magnet rotor 60, the rotor 54, and the base plate 56 will begin to rotate relative to the housing 32. Once the base plate 56 begins to rotate, the load transferring balls 80 will roll in the first and second series of cams 74,76. This will cause the cam plate 78 and base plate 56 to move apart, and the cam plate 78 to move toward, and apply force to, the thrust bearing 114. The cam plate 78 will only be allowed to slide to the left or right when looking at FIG. 1, the cam plate 78 is not allowed to rotate because of the projection. This force is transferred through to the apply plate 110, compressing the clutch pack 100. The reaction force from the clutch pack 100 is transferred back through the apply plate 110, the thrust bearing 114, the cam plate 78, the load transferring balls 80, the base plate 56, the rotor 54, the thrust bearing 58, and the housing 32. The force applied to the clutch pack 100 is also transferred through to the clutch housing 98. The clutch housing 98 will translate this force to the shaft engaged to the second set of splines 118.

If the first and second detents 82, 84 are used, the force of rotation by the base plate 56 must overcome the force of the first and second set of detents 82, 84 holding the load transferring balls 80 in place. Once the load transferring balls 80 roll out of the first and second detents 82, 84, as stated above, the base plate 56 and the cam plate 78 will move away from one another; the cam plate 78 will begin to move toward, and apply force to, the thrust bearing 114.

Once the clutch pack 100 is fully compressed, the input member 12 will rotate in unison with the output member 14. However, if it is desired to transfer a reduced amount of rotational force from the input member 12 to the output member 14, the electric current applied to the coil windings 64 can be reduced, and the amount of rotation by the rotor 54, and therefore the base plate 56 and magnet rotor 60, will be reduced as well. The distance the cam plate 78 will move toward the thrust bearing 114 is based on the rotation of the base plate 56. Varying the amount of current applied to the coil windings 64 will vary the amount of rotation of the base plate 56, and therefore vary the distance the cam plate 78 will translate toward the thrust bearing 114, thereby varying the amount of force applied to the clutch pack 100.

The amount of rotation of the magnet rotor 60, the rotor 54, and the base plate 56 about the axis 120 is measured by the magnet 66 and the sensor 68. The output of the sensor 68 and the amount of current applied to the coil windings 64 can be controlled by a common electronic control unit (not shown). Other sensors could be used instead of the sensor 68, such as a sensor for sensing the position of the base plate 56, the cam plate 78, or a load sensor for detecting the load applied to the clutch pack 100.

Figure 5:
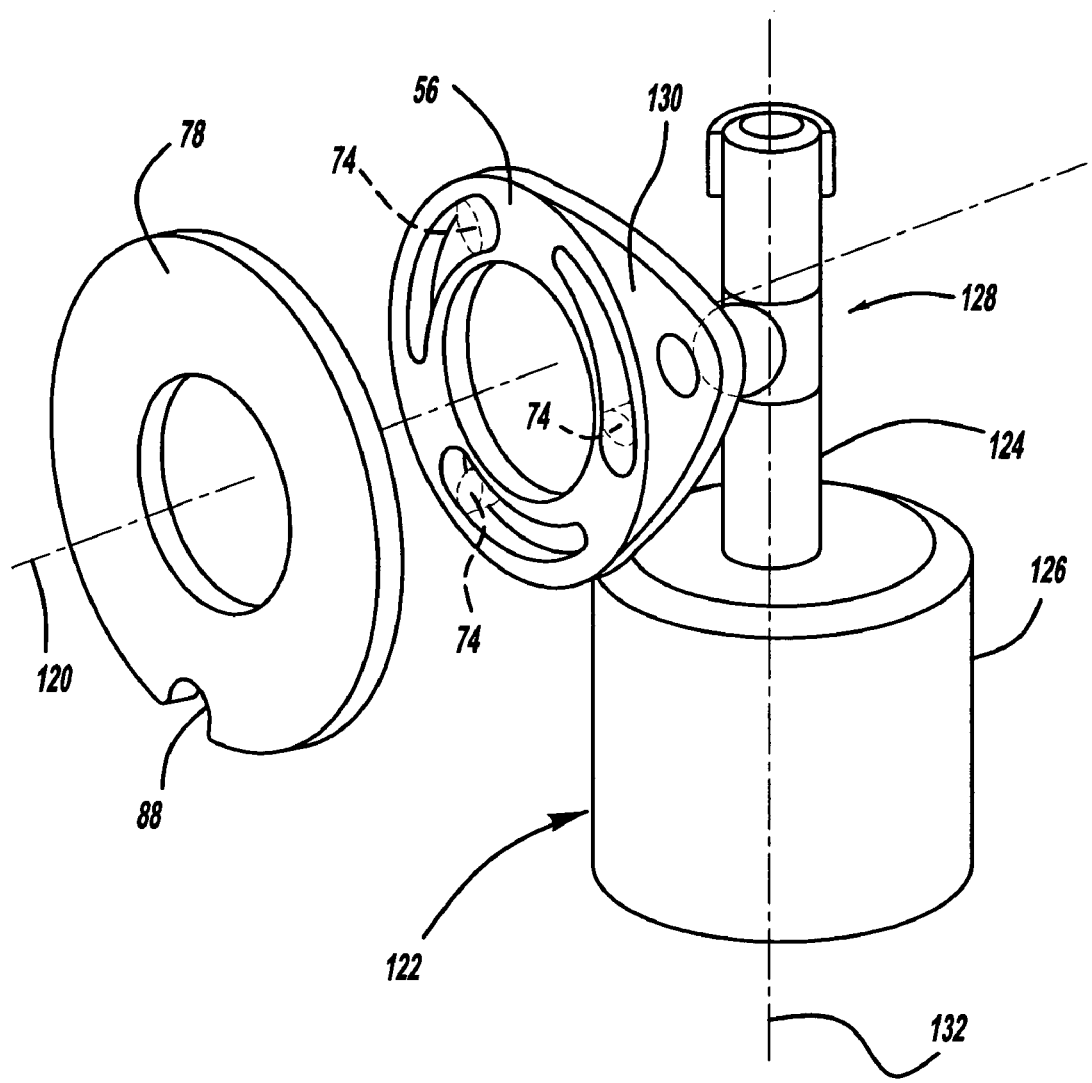
FIG. 5 is a perspective view of a second embodiment of a clutch assembly incorporating a long travel solenoid, according to the present invention.

A second embodiment of the actuator is shown in FIG. 5. Instead of having the rotor 54, the magnet rotor 60, and stator 62, and the coil windings 64, this embodiment includes a long-travel solenoid, generally shown at 122. The long-travel solenoid 122 includes a plunger 124, disposed within a solenoid housing 126, and a ball-crank mechanism, generally shown at 128. The plunger 124 is connected to a series of coil windings (not shown) which are located inside the solenoid housing 126. The ball crank mechanism 128 connects the base plate 56 to the plunger 124. In this embodiment, the base plate 56 is shaped to have an extension 130 which connects to the ball crank mechanism 128. The plunger 124 is disposed on a plunger axis 130, and translates along the plunger axis 130 when the long-travel solenoid 122 is actuated. The cam plate 78 includes the anti-rotation feature 88, which, similar to the first embodiment, engages with the projection to prevent the cam plate 78 from rotating relative to the housing 32 about the axis 120.

In FIG. 5, the housing 32, input member 12, and output member 14 have been removed for clarity purposes such that the actuation of the base plate 56 can be more easily shown. In operation, a current is applied to the coil windings inside the solenoid housing 126, causing the plunger 124 to translate along the plunger axis 132. This will cause the base plate 56 to rotate about the axis 120 in a similar manner described in the previous embodiment. However, if the plunger 124 were connected directly to the base plate 56, as the base plate 56 is rotated, the base plate 56 would pull the plunger 124 and cause the plunger 124 to be out of alignment with the plunger axis 132, increasing the possibility of the plunger 124 binding up with the coil winding inside the solenoid housing 126. The ball crank mechanism 128 allows the plunger 124 to rotate the base plate 56, while staying in alignment with the plunger axis 132.

Once the base plate 56 rotates, again the force of rotation will cause the cam plate 78 to translate along the axis 120 in a similar manner described in the previous embodiment, generating an apply force against the thrust bearing 114. Once force is applied to the thrust bearing 114, the force will be transferred to the apply plate 110, compressing the clutch pack 100. Once again, if the first and second detents 82, 84 are used, the force applied to the load transferring balls 80 must be enough to lift the load transferring balls 80 out of the first and second detents 82, 84.

Figure 6:
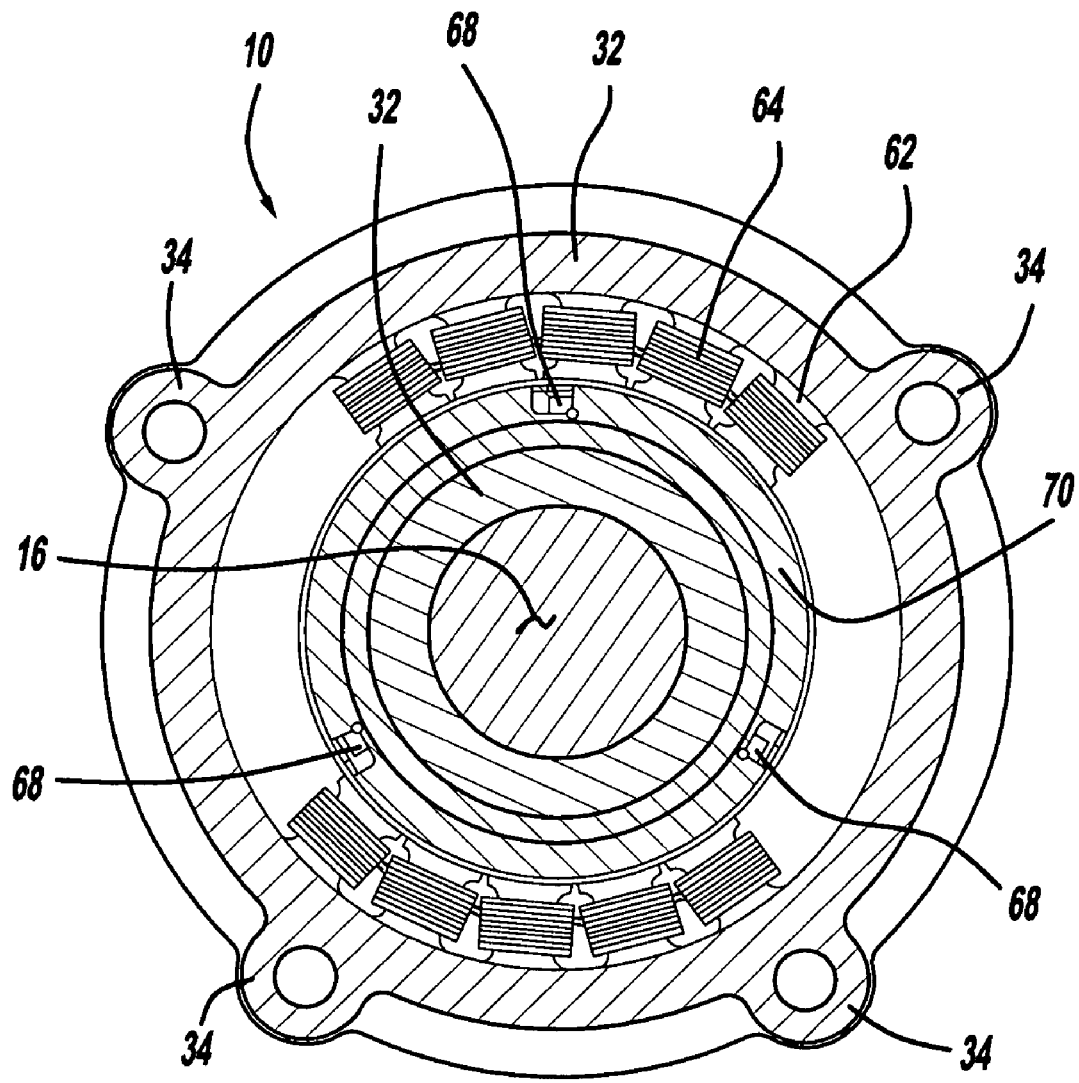
FIG. 6 is an alternate embodiment of the clutch assembly shown in FIG. 3, with a portion of the coil windings removed, according to the present invention.

Another embodiment of the present invention is shown in FIG. 6. This embodiment is similar to the embodiment shown in FIGS. 1-4, however, a portion of the coil windings 64 have been removed. The amount of coil windings 64 used can vary, depending upon the application in which the clutch assembly 10 is going to be used. More windings 64 can produce a greater rotational force, and therefore a greater apply load to the clutch pack 100. The embodiment shown in FIG. 6 includes five coil windings 64 on each side of the magnet rotor 60, but it is within the scope of the invention that more or less windings 64 may be used.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An actuation assembly, comprising:
   a clutch apply member;
   a base plate disposed about an axis;
   a cam plate non-rotatably disposed about said axis, said cam plate operable for translating axially along said axis;
   at least one cam, operably associated with said base plate and said cam plate;
   at least one load transferring member operably associated with said at least one cam; and
   an actuator having a rotor connected to said base plate such that said rotor and said base plate rotate about said axis in unison and said actuator provides relative rotation between said cam plate and said base plate about said axis, causing said at least one load transferring member to move with respect to said at least one cam, and said cam plate to translate along said axis actuating said clutch apply member.

2. The actuation assembly of claim 1, wherein said actuator is selectively actuatable for providing variable rotation between said base plate and said cam plate about said axis, and the distance said cam plate translates along said axis can be selected for variable actuation of said clutch apply member.

3. The actuation assembly of claim 1, said at least one cam is further comprised of said base plate having at least one cam and said cam plate having at least one cam, said base plate being rotatable about said axis in response to activation of said actuator, causing said at least one load transferring member to move relative to said at least one cam of said cam plate and said at least one cam in said base plate, causing said cam plate to translate along said axis by rotational actuation of said base plate.

4. The actuation assembly of claim 3, further comprising:
   at least one detent disposed in said at least one cam of said cam plate;

at least one detent disposed in said at least one cam of said base plate; and said at least one load transferring member is at least one load transferring ball, said at least one detent of said cam plate and said at least one detent of said base plate operable to maintain the position of said at least one load transferring ball in said at least one cam of said base plate and said at least one cam of said cam plate.

5. The actuation assembly of claim 1, said at least one cam further comprising a first series of cams on said base plate and a second series of cams on said cam plate, and said first series of cams are operably associated with said second series of cams such that when said base plate rotates about said axis, said at least one load transferring member will move relative to said first series of cams and said second series of cams, causing said cam plate to translate along said axis.

6. The actuation assembly of claim 5, further comprising:
a first set of detents disposed on said first series of cams;
a second set of detents disposed on said second series of cams; and
said at least one load transferring member further comprising a series of load transferring balls, and said first set of detents and said second set of detents maintain the position of said series of load transferring balls in said first series of cams and said second series of cams when said actuator is not activated.

7. The actuation assembly of claim 1, further comprising:
said clutch apply member having a first series of clutch plates splined to an input member, and a second series of clutch plates splined to an output member, said second series of clutch plates interleaved with said first series of clutch plates;
an apply plate driven by said input member, said apply plate operably associated with said first series of clutch plates; and
a thrust bearing disposed between said apply plate and said cam plate for allowing said apply plate to rotate relative to said cam plate, and when said cam plate is translated along said axis by the rotation of said base plate, said cam plate will transfer force through said thrust bearing to said apply plate, causing said apply plate to compress said clutch pack and said input member to transfer rotational force to said output member.

8. The actuation assembly of claim 1, said actuator further comprising:
said rotor is connected to, and circumscribed by, a magnet rotor; and
a stator having at least one coil winding, with said stator surrounding said magnet rotor such that when electrical power is applied to said at least one coil winding, said rotor and said base plate rotate, causing said at least one ball to rotate within said at least one cam of said cam plate, and said at least one cam of said base plate, and said cam plate to translate along said axis.

9. A clutch actuator assembly, comprising:
an input member disposed within a housing, rotatable about an axis;
an output member selectably engagable with said input member, said input member and said output member rotatable about said axis;
a base plate having a first series of cams, said base plate disposed about, and able to rotate relative to, said input member;
a cam plate non-rotatably disposed about said axis and operable to translate along said axis, said cam plate having a second series of cams, said input member extending through, and able to rotate relative to, said cam plate;
at least one load transferring ball disposed within said first series of cams and said second series of cams;
an actuator having a rotor connected to said base plate such that said rotor and said base plate rotate about said axis in unison and said actuator causes relative rotation between said cam plate and said base plate; and
a clutch pack for coupling and decoupling movement between said input member and said output member such that when said actuator is actuated, said base plate and said rotor rotate about said axis relative to said cam plate, causing said at least one load transferring ball to rotate within said first series of cams and said second series of cams, and said cam plate to translate along said axis to transfer force to said apply plate, thereby compressing said clutch pack.

10. The clutch actuator assembly of claim 9, said actuator further comprising:
a magnet rotor circumscribing, and connected to, said rotor; and
a stator having a series of coil windings, said stator mounted to said housing, and when an electric current is applied to said coil windings, said coil windings will cause said magnet rotor and said rotor to rotate about said axis, thereby causing said base plate to rotate about said axis.

11. The clutch actuator assembly of claim 9, said clutch pack further comprising:
a first series of clutch plates splined to said input member;
a second series of clutch plates splined to said output member, said second series of clutch plates interleaved with said first series of clutch plates; and
an apply plate slidably disposed on said input member through a spline connection, and when said cam plate is translated along said axis in the direction of said clutch pack, said cam plate will transfer force to said apply plate, causing said clutch pack to compress and said input member to rotate in unison with said output member.

12. The clutch actuator assembly of claim 9, said first series of cams having a first set of detents, said second series of cams having a second set of detents, and when said at least one load transferring ball is disposed in said first set of detents and said second set of detents, said base plate is maintained in a stationary position when said actuator is not actuated.

13. The clutch actuator assembly of claim 9, said actuator further comprising:
a magnet rotor circumscribing said rotor, said rotor connected to said base plate; and
a stator mounted in said housing, said stator having at least one coil winding, said stator surrounding said rotor, and when electrical power is applied to said at least one coil winding, said rotor will rotate, causing said at least one ball to rotate within said at least first series of cams and said second series of cams, and said cam plate to translate along said axis.

14. A clutch actuator assembly, comprising:
a base plate disposed about an axis;
an input member disposed about said axis, said input member extending through, and able to rotate relative to, said base plate;
an actuator disposed about said axis, said actuator having a stator mounted to a housing, a rotor connected to said base plate such that said rotor and said base plate rotate about said axis in unison, and a magnet rotor circumscribing, and connected to, said rotor;

a cam plate circumscribing said input member;

an output member disposed about said axis and selectably engagable with said input member by way of a clutch pack;

a first series of cams disposed on said base plate;

a second series of cams disposed on said cam plate, said first series of cams substantially in alignment with said second series of cams; and a series of load transferring balls disposed within said first series of cams and said second series of cams, and when an electric current is applied to said stator, said stator will cause said magnet rotor to rotate, thereby causing said rotor and said base plate to rotate about an axis, and said load transferring balls to rotate in said first series of cams and said second series of cams, causing said cam plate to translate along said axis, applying force to said clutch pack and therefore said input member to transfer rotational force to said output member.

15. The clutch actuator assembly of claim 14, said clutch pack further comprising:

a first series of clutch plates operably associated with said input member;

a second series of clutch plates operably associated with said output member, said second series of clutch plates being interleaved with said first series of clutch plates; and an apply plate operably associated with said input member and said first series of clutch plates, such that when said cam plate is translated along said axis, force will be transferred from said cam plate to said apply plate, compressing said first series of clutch plates and said second series of clutch plates.

16. The clutch actuator assembly of claim 14, further comprising:

said first series of cams having a first set of detents; and said second series of cams having a second set of detents, and when said first set of detents and said second set of detents maintain said series of load transferring balls in a stationary position, thereby holding said cam plate in a stationary position relative to said base plate, and when said base plate is rotated, said series of load transferring balls will rotate out of said first set of detents and said second set of detents and roll in said first series of cams and said second series of cams causing said cam plate to translate along said axis.

* * * * *